United States Patent [19]
Akins et al.

[11] Patent Number: 6,166,787
[45] Date of Patent: Dec. 26, 2000

[54] OPTICAL DISPLAY DEVICE HAVING PRISMATIC FILM FOR ENHANCED VIEWING

[75] Inventors: Robert Benjamin Akins, Palatine; George Thomas Valliath, Buffalo Grove; Kevin William Jelley, LaGrange Park, all of Ill.

[73] Assignee: Motorola, Inc., Schaumburg, Ill.

[21] Appl. No.: 09/040,047

[22] Filed: Mar. 17, 1998

[51] Int. Cl.$^7$ ................. G02F 1/1335; H04N 9/07; G03B 21/228; H04J 14/02; G02B 5/04

[52] U.S. Cl. ................. 349/57; 349/113; 348/337; 353/81; 359/129; 359/836

[58] Field of Search ................. 349/57, 113; 359/129, 359/832, 837, 838; 353/33, 81; 348/337, 338

[56] References Cited

U.S. PATENT DOCUMENTS

| | | | |
|---|---|---|---|
| 3,752,974 | 8/1973 | Baker et al. | 340/1 EL |
| 4,011,001 | 3/1977 | Moriya | 350/160 LC |
| 4,017,155 | 4/1977 | Yagi et al. | 350/160 LC |
| 4,252,416 | 2/1981 | Jaccard | 350/345 |
| 4,282,560 | 8/1981 | Kringel et al. | 362/26 |
| 4,573,766 | 3/1986 | Bourney, Jr. et al. | 350/345 |
| 4,726,662 | 2/1988 | Cromack | 349/57 |
| 4,737,896 | 4/1988 | Mochizuki et al. | 362/301 |
| 4,798,448 | 1/1989 | van Raalte | 350/345 |
| 4,799,137 | 1/1989 | Aho | 362/309 |
| 4,822,145 | 4/1989 | Staelin | 350/345 |
| 4,874,228 | 10/1989 | Aho et al. | 350/345 |
| 4,896,953 | 1/1990 | Cobb, Jr. | 350/452 |
| 4,929,062 | 5/1990 | Guzik et al. | 350/345 |
| 4,975,808 | 12/1990 | Bond et al. | 362/31 |
| 4,989,125 | 1/1991 | Cobb, Jr. et al. | 362/346 |
| 5,005,108 | 4/1991 | Pristash et al. | 362/31 |
| 5,029,060 | 7/1991 | Aho et al. | 362/299 |
| 5,040,878 | 8/1991 | Eichenlaub | 350/345 |
| 5,040,883 | 8/1991 | Cobb, Jr. | 350/452 |
| 5,070,431 | 12/1991 | Kitazawa et al. | 362/31 |
| 5,126,882 | 6/1992 | Oe et al. | 349/57 |
| 5,136,479 | 8/1992 | Ruffner | 362/29 |
| 5,190,370 | 3/1993 | Miller et la. | 362/340 |
| 5,477,239 | 12/1995 | Busch et al. | 345/102 |
| 5,557,433 | 9/1996 | Maruyama et al. | 349/112 |
| 5,600,456 | 2/1997 | Maruyama et al. | 349/112 |
| 5,608,550 | 3/1997 | Epstein et al. | 359/40 |
| 5,629,784 | 5/1997 | Abileah et al. | 349/112 |
| 5,671,028 | 9/1997 | Okano | 349/57 |
| 5,706,066 | 1/1998 | Sawayama et al. | 349/113 |
| 5,724,111 | 3/1998 | Mizobata et al. | 349/113 |
| 5,797,668 | 8/1998 | Kojima et al. | 349/57 |
| 5,914,759 | 6/1999 | Higuchi et al. | 349/57 |
| 5,917,664 | 6/1999 | O'neill et al. | 349/57 |
| 5,940,152 | 8/1999 | Wilson et al. | 349/57 |
| 5,949,506 | 9/1999 | Jones et al. | 349/112 |

FOREIGN PATENT DOCUMENTS 361008129  1/1987  Japan .

OTHER PUBLICATIONS

Hiyama, et al., "P–45: High–Performance Reflective STN–LCD with a Blazed Reflector", *SID 97 Digest*, pp. 655–658.

Primary Examiner—William L. Sikes
Assistant Examiner—Tarifur R. Chowdhury
Attorney, Agent, or Firm—Douglas D. Fekete

[57] ABSTRACT

The display device includes an optical cell having a cell front with at least one cell region being capable of an optically transmissive mode and an optically nontransmissive mode with reference to the cell front. The optical cell contains an optically active material responsive to an applied electrical field such that optical properties of the material are controllably changeable. A reflector may be optically coupled to the cell. A prismatic film including a prismatic surface is optically coupled to the optical cell. The prismatic surface preferably comprises a series of prisms. The prisms have first faces and second faces intersecting the first faces. The first faces are oriented to refract light obliquely intercepting the first faces and the second faces are oriented to minimize refractive, reflective, and optical interactions of the light with the second faces. The prismatic film, the cell, and the reflector optically cooperate such that light entering a display at an incident angle is emitted from the display at an exiting angle distinct from the incident angle for viewing of the display.

37 Claims, 6 Drawing Sheets

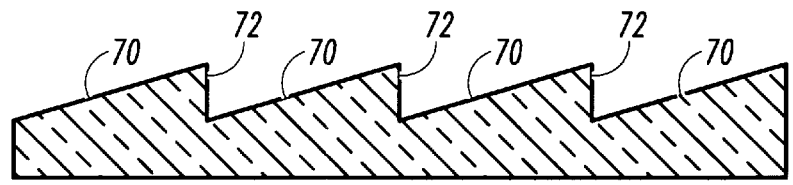
12    FIG.8
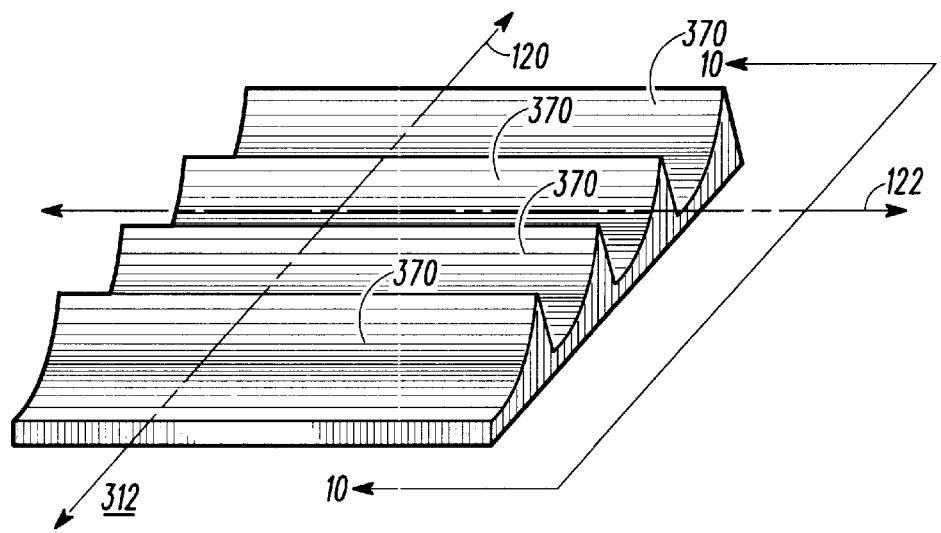
FIG.9
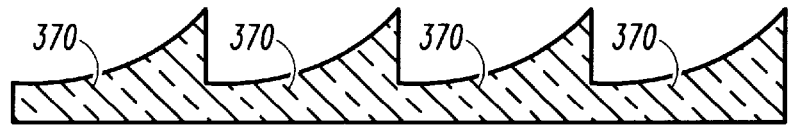
312    FIG.10

OPTICAL DISPLAY DEVICE HAVING PRISMATIC FILM FOR ENHANCED VIEWING

FIELD OF THE INVENTION

The present invention relates generally to an optical display device. More particularly, the present invention relates to a reflective, optical display device having a prismatic film to enhance a viewer's perceived brightness of the display in a preferred viewing cone.

BACKGROUND OF THE INVENTION

Prior-art optical displays include back-lighted liquid crystal displays and reflective liquid crystal displays. Back-lighted displays consume more power than reflective displays do. In addition, back-lighted displays are larger and heavier than reflective displays. Thus, back-lighted displays have significant disadvantages for use in portable electronic products.

Reflective displays rely on ambient light to illuminate the pixels, symbols, or characters of the displays. Reflective displays are susceptible to the negative influence of glare that is typically attendant with the ambient light illuminating the display. As used herein, glare or glare light rays refer to an unwanted reflection of incident ambient light off any interface associated with the display device. The glare light rays produce a reflection which has no utility for viewing purposes. Conventional reflectors within displays frequently reflect light such that the direction of maximum brightness of the display is at substantially the same angle as the glare light rays. Consequently, the glare light rays in reflective displays often coincide with a viewer's preferential viewing angle of the display device. The glare greatly reduces the effectiveness of the display by reducing the contrast between inactive and active pixels. Annoyed viewers may need to reorient their viewing angle to view displays away from glare and away from the maximum brightness of the displays.

In a reflective display, ambient light may illuminate a physical viewing interface (i.e. lens) and contribute to the glare perceived by a viewer. The physical viewing interface is preferably coincident with an imaginary viewing plane. The ambient light passes through the viewing plane at one or more incident angles. The incident angles are determined by the propagational direction of the ambient ambient light relative to the viewing plane. The magnitude of the incident angles and the refractive index of the viewing interface determine the extent that ambient light is either transmitted through the viewing plane into the display, or reflected at the viewing plane and potentially perceived as glare by a viewer.

Even the light initially transmitted through the viewing plane may contribute to the glare perceived by a user. The reflective display may have internal refractive interfaces, such as the refractive interfaces associated with the transparent metal electrodes of a twisted nematic display. Such refractive interfaces can reflect some incident light toward the viewing plane and the viewer, reducing the effectiveness of the display.

Holographic reflectors have been placed in reflective liquid crystal displays (LCD's) to ameliorate the affects of glare. While holographic reflectors tend to place the viewing angle in a different direction than the glare, single-layer holographic reflectors tend to act like narrow band filters; hence, appear colored to the user. Multiple-layer holographic filters may be achromatic, but the thickness and additional cost over single layer holographic filters have limited commercial use of the multiple-layer holographic filters.

Therefore, a need exists for a reflective optical display device that minimizes glare degradation, while providing an achromatic, compact and commercially practical display.

SUMMARY OF THE PRESENT INVENTION

The present invention relates to an optical display device that includes an optical cell, such as a liquid crystal cell. The optical cell includes a cell front and a cell back. The optical cell has a cell region which is capable of an optically transmissive mode and a nontransmissive mode. The cell contains an optically active material, such as an optically anisotropic material or a liquid crystal material. The optically active material is responsive to an applied electric field such that the optical properties of the material are controllably changeable. A reflective means for reflecting light incident upon the reflective means is associated with the optical cell. A prismatic film preferably has a prismatic surface optically coupled to the optical cell. The refractive index of the prismatic film, relative to adjoining regions of the display, and the facial geometry of the prismatic surface are selected such that light entering the display at a nonglancing incident angle is emitted from the display at an exiting angle distinct from the incident angle. The exiting angle and the incident angle are preferably measured relative to an axis normal to a viewing plane that is substantially parallel to the cell front.

The prismatic surface comprises a series of prisms. Each of the prisms preferably has a first face and a second face intersecting the first face. The first face is oriented to refract light that obliquely intercepts the first face such that the primary exiting light exiting the display falls within a preferential viewing cone about the axis normal to the viewing plane. The second face is oriented to minimize refractive, reflective, and optical interactions such that secondary exiting light exiting the display has minimal side lobes with respect to the preferential viewing cone.

The prismatic film may be separated from the optical cell by an adjoining region, such as a substantially transparent adhesive or at least one air space. The prismatic film has a first refractive index which is different from a second refractive index of the adjoining region (i.e. transparent adhesive). The second refractive index is preferably lower than the first refractive index such that light is refracted appropriately into the preferential viewing cone. In sum, the preferential viewing cone is primarily a function of the first refractive index, the second refractive index, and a first slope or a first prismatic angle of the first face with respect to a plane parallel to the viewing plane.

The prismatic film refracts light traveling to and from the optical cell to reduce glare. Incident light enters the display cell at a nonglancing incident angle and primary exiting light leaves the display cell at an exiting angle, which is different in magnitude from the incident angle. The magnitude of the incident angle and the exiting angle are preferably measured with respect to a normal axis that is perpendicular to the viewing plane. The nonglancing incident angle is an oblique angle relative to the viewing plane. The nonglancing incident angle results in no substantial reflections relative to the viewing plane or a lens in accordance with Snells' law. The nonglancing incident angle may be assumed to predominately fall within a range of approximately twenty-five to forty-five degrees from the normal axis of the viewing plane. The assumed range of the nonglancing incident angles is selected based upon a user's tendency to orient the display relative to indoor, overhead lighting and perceived glare. Based upon the assumed range of incident angles, the primary exiting angle typically is closer to the normal than the incident angle because of the refractive activity of the prismatic film.

The difference in the incident angle with respect to the primary exiting angle improves visibility of the display by steering exiting light into a preferential viewing cone or preferred viewing angle. The preferential viewing cone or angle contains the primary exiting light at the exiting angle. The preferential viewing cone is defined by a conical region about the normal axis. The preferential viewing cone optimally encompasses the conical region from approximately zero to ten degrees relative to the normal axis. Therefore, the prismatic film may reduce the glare and increase the legibility of the display, which is illuminated by ambient light.

BRIEF DESCRIPTION OF THE DRAWINGS

FIG. 8 is a cross-sectional view of the prismatic film as viewed along reference line 8—8 in FIG. 7 in the direction of the arrows.

FIG. 9 is a perspective view of a secondary embodiment of the prismatic film, which has concave first faces.

FIG. 10 is a cross-sectional view of the prismatic film as viewed along reference line 10—10 in FIG. 9.

DETAILED DESCRIPTION OF A PREFERRED EMBODIMENT

The present invention is best understood by first defining various terms used throughout the specification. As used herein, "optically coupled" refers to elements in optical communication with each other that permit the bi-directional transmission of light in at least one plane.

The viewing plane 26 refers to an imaginary flat surface defined by a mathematical plane substantially parallel to the cell front 56. In practice, the viewing plane 26 may be coincident with a lens of the display. The viewer views the display by looking toward or into the viewing plane 26.

Figure 1:
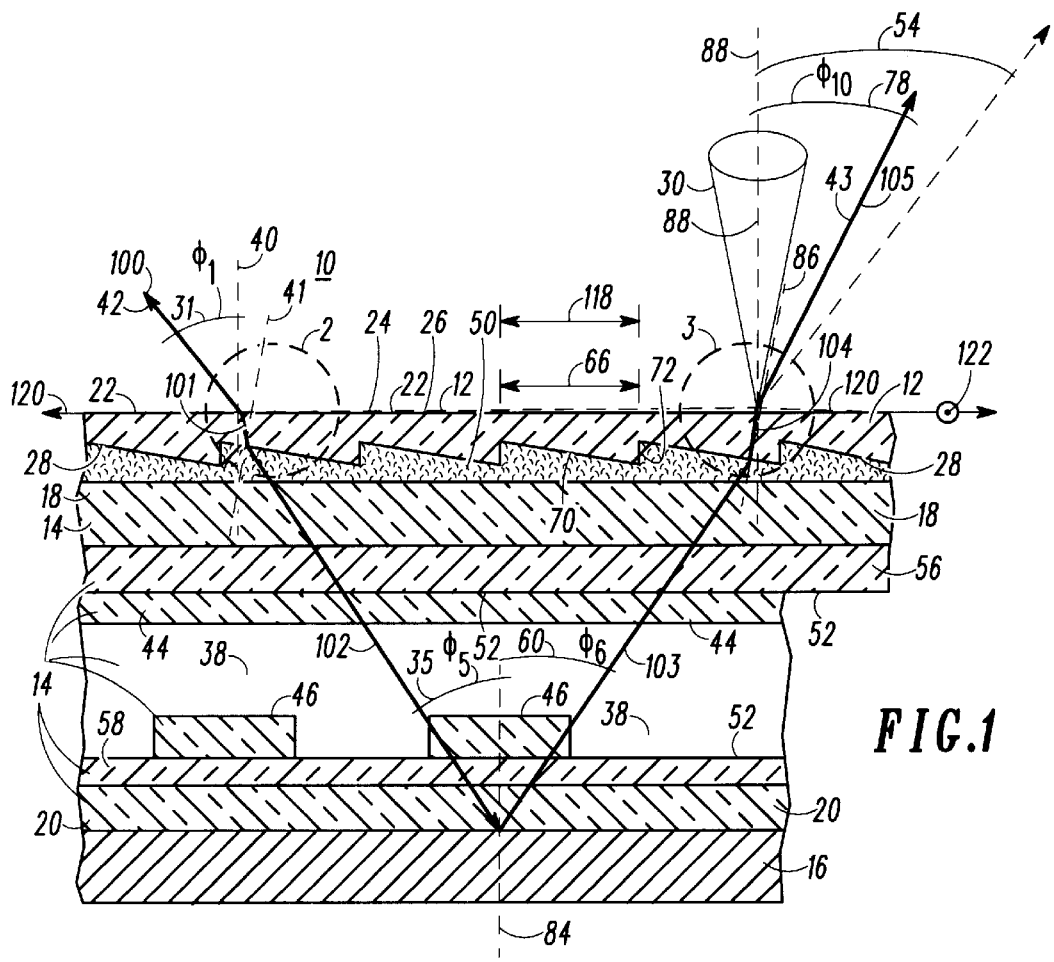
FIG. 1 is a cross-sectional view of a first embodiment of an optical display device.

As used herein, light shall refer to a group of light rays represented by a representative ray. The representative ray represents the general direction of propagation of an illustrative group of light rays. For example, the direction of propagation of incident light 42 may be represented by a representative ray. In FIG. 1, the representative ray is divided into a first section 100, a second section 101, a third section 102, a fourth section 103, a fifth section 104, and a sixth section 105. The first section 100 of the representative ray is called incident light 42 and the sixth section 105 of the representative ray is called primary exiting light 43. The representative ray shown is merely an illustrative example of one possible path of the light interacting with the optical display; other paths are possible. In practice, multiple light rays with different paths typically interact with the optical display.

The incident light 42 is a portion of ambient light which enters the display through a viewing plane 26 of the display. Such incident light 42 is sometimes called irradiance or illuminance. Nonglancing incident light is a light ray that enters the display at an nonglancing angle distinct from the critical angle defined by Snell's law so that no substantial reflection of the light occurs relative to a physical viewing interface 22 of the display coincident with the viewing plane 26. Ambient light sources include those sources found in a well-lit room or outdoors. Several ambient sources may irradiate the optical display device 10 from one or more directions and with varying intensity. The ambient light coming from multiple sources and multiple directions may cooperate in illuminating the display for viewing.

The optically transmissive mode allows sufficient transmission of light through the optical cell 14 to permit a viewer to distinguish the transmissive mode from the nontransmissive mode. The optically transmissive mode permits the transmission of light through a particular cell region between the cell front 56 and the cell back 58 such that the light transmitted through the cell is perceptible to a viewer. The attenuation of the cell in the transmissive mode is minimized to keep an adequate intensity differential between to the transmissive mode and the nontransmissive mode, yielding a sufficiently contrasted, viewable display for a viewer. The optically nontransmissive mode either attenuates or reflects light by an amount sufficient to significantly reduce the intensity of the light traversing the entire cell region. The reduction of intensity of the nontransmissive mode is maximized to keep an adequate intensity differential between the transmissive mode and the nontransmissive mode.

In accordance with a preferred embodiment of the present invention, FIG. 1 depicts an optical display device 10 that comprises a prismatic film 12, optical cell 14, and a reflector 16. The display device 10 preferably requires illumination by ambient light through a viewing plane 26 and is viewed through the viewing plane 26. The viewing plane 26 may be coincident with a physical viewing interface 22, such as a lens or a planar transparent member.

The prismatic film 12 includes a prismatic surface 28 and an opposite surface 24 opposite the prismatic surface 28. The opposite surface 24 is preferably substantially planar and smooth. The viewing plane 26 of the optical display device 10 may coincide with the opposite surface 24 of the prismatic film 12 as best illustrated in FIG. 1. Because the opposite surface 24 is substantially planar, the opposite surface 24 is readily cleaned, dusted, or polished by virtue of its smooth finish so long as the opposite surface 24 is exposed as the physical viewing interface 22 upon an exterior of the display. While the prismatic surface 28 preferably faces the optical cell 14 as illustrated in FIG. 1, in alternate embodiments the prismatic surface may face away from the optical cell 14 to refract light into the preferential viewing cone 30.

The prismatic surface 28 comprises a series of prisms or prismatic elements. Each of the prisms has a first face 70 and a second face 72 intersecting the first face 70. The first faces 70 are oriented to refract light obliquely intercepting the first faces 70 such that the primary exiting light 43 exiting the display is directed into a preferential viewing cone 30 about an axis normal to the viewing plane 26. The light predominately interacts with the first face 70 at oblique angles based upon the nonglancing incident angle of the incident light 42 passing through the viewing plane 26 into the display. The first faces 70 are preferably oriented to maximize the refractive interactions of light propagating to and from the optical cell 14 such that an incident angle of incident light 42 relative to the viewing plane 26 is distinct from the magnitude and direction of an exiting angle of the primary exiting light 43. The second faces 72 are oriented to minimize refractive, reflective and optical interactions of the light with the second faces 72 so that side lobes of secondary exiting light are minimized. The secondary exiting light falls outside the preferential viewing cone 30 and the secondary exiting light rays are called side lobes.

As shown, each prismatic element has a generally triangular cross-section characterized by a base 66 and a height 68. Each prism has a longitudinal axis 122 that is oriented perpendicularly to the triangular cross-section and its cross-sectional axis 120. The first face 70 has a first slope defining a first prismatic angle 80 with respect to a plane substantially parallel to the opposite surface 24 or the viewing plane 26. The first prismatic angle 80 may range from 10 degrees to 60 degrees. The prismatic angle 80 optimally has a range from approximately 15 to 25 degrees to refract light interacting with the first face 70 into a preferential viewing cone 30. The second face 72 has a second slope defining a second prismatic angle 82 with a plane substantially parallel to the opposite surface 24 or the viewing plane 26. The first prismatic angle 80 may be less than or equal to 90 degrees. The prismatic angle 80 preferably ranges from 45 degrees to 90 degrees.

In alternate embodiments, the first prismatic angle and the second prismatic angle may have different magnitudes than previously described herein.

The prismatic film 12 has a maximum thickness 74 defined by the distance between the peak of a prism and the opposite surface 24. The prisms have a peak-to-peak spacing between adjacent peaks which is called the pitch 118 of the prismatic surface 28. The ratio of the maximum thickness 74 to the pitch 118 is maximized to maximize refractive steering of the incident light 42 into the preferential viewing cone 30. However, the pitch is preferably limited to less than or equal to the pixel size if the prismatic film 12 is located between the viewing interface 22 and the optical cell 14 as shown in FIG. 1. The pitch 118 may exceed the pixel size to maximize refractive steering; especially in alternate embodiments where the prismatic film is located behind the optical cell, or between the optical cell and a reflector.

An illustrative example of the prismatic film 12, which may be used to practice the present invention, has a triangular cross-section defined by a typical base 66 dimension of 200 microns, a typical height 68 of 75 microns, a typical maximum thickness 74 of 150 microns, a front slope angle 80 of approximately 20 degrees, and a rear slope angle 82 of approximately 90 degrees. The prismatic film 12 preferably has a height 68 within a range from approximately 60 to 100 microns. The prismatic elements optimally adjoin one another in the illustrative example. If magnified sufficiently, the prismatic elements preferably are arranged to give the prismatic surface 28 a jagged profile which resembles the profile of lapped siding on a house.

The prismatic film 12 has a first refractive index that optimally exceeds 1.4. The actual first refractive index depends upon the particular material used to make the prismatic film 12; typically ranges from 1.5 to 1.6 for transparent polymers and polycarbonates. In comparison, air has an index of refraction of approximately 1.

A transparent adhesive 50 preferably attaches the prismatic film 12 to the optical cell 14. The transparent adhesive 50 fills the voids or air-space bounded by the prismatic film 12 and the optical cell 14. The transparent adhesive 50 may be made from acrylic resin, acrylate, silicone, epoxy, polyester resin, vinyl ester resin, polycarbonate resin, a plastic, or a polymer. In a preferred embodiment, acrylic resin or acrylate is used for the transparent adhesive 50.

The transparent adhesive 50 for affixing the prismatic film 12 to the display device 10 has a second refractive index which is different from the first refractive index of the prismatic film 12. The first refractive index typically differs from the second refractive index of the transparent adhesive 50 within a range between 0.2 and 0.3, based upon common, commercially available transparent adhesives. More preferably, the first refractive index and the second refractive index differ from one another by greater than 0.3. In the preferred embodiment, the second refractive index is lower than the first refractive index. However, in alternate embodiments the second refractive index may be higher than the first refractive index.

The optical cell 14 may comprise a liquid crystal cell, a twisted nematic (TN) liquid crystal cell, a super-twisted nematic (STN) liquid crystal cell, a thermally addressable cell, a dynamic-scattering liquid crystal cell, a guest-host effect dichroic dye cell, a chiral nematic display, or the like.

In accordance with the illustrative embodiment of FIG. 1, the optical cell 14 comprises a twisted nematic effect liquid crystal cell, commonly referred to as a TN or an STN cell. The optical cell 14 optimally includes front polarizer 18, front electrode 44, liquid crystal material 38, at least one back electrode 46, and back polarizer 20. The front polarizer 18 is optically coupled to the prismatic film 12 and to a cell front 56 of the optical cell 14. The front polarizer 18 may comprise a dichroic polarizing film. Those of ordinary skill in the art will appreciate that no polarizers are required for certain configurations of optical displays that fall within the scope of the invention, such as certain guest-host effect cells.

The optical cell 14 has a cell front 56 and a cell back 58. The optical cell 14 contains an optically active material, an optically anisotropic material, a liquid crystal material, or the like. For example, a liquid crystal material 38 is confined between the cell front 56 and the cell back 58. The cell back 58 and the cell front 56 may be made from glass or another transparent material. For example, the liquid crystal material may be disposed between sheets of a transparent polymer. Liquid crystal material 38 typically is composed of anisometric, organic molecules which tend to have elongated, rod-like shapes. Liquid crystal materials may have nematic or smectic properties, depending upon the arrangement of the molecules of the liquid crystal material. Nematic liquid crystals are commonly used in twisted nematic liquid crystal displays.

The cell front 56 and the cell back 58 support a front electrode 44 and one or more back electrodes 46, respectively. The front electrode 44 and the back electrodes 46 are adjacent to liquid crystal material 38. The back electrodes 46 are affixed to inner surface 52 of liquid crystal panel 38. In FIG. 1, the front electrode 44 and the back electrodes 46 are made from substantially transparent conductive materials or metals. The front electrode 44 and the back electrodes 46 are preferably made of a transparent indium-tin oxide material. Those of ordinary skill in the art will appreciate that alternate embodiments of the present invention may use reflective, opaque back electrodes.

The front electrode 44 and the back electrodes 46 may have any shape or size. The front electrode 44 and the back electrode 46 may have different shapes. The front electrode 44, the back electrodes 46, or both the front electrode 44 and the back electrode 46 are generally shaped as pixels, symbols, characters, or portions of characters to be displayed. The front electrode 44 and back electrodes 46 are connected to an external power supply, not shown. When an alternating current, or less preferably a direct current, is applied to the front electrode 44 and at least one back electrode 46 the properties of the liquid crystal change with regards to the liquid crystal material's 38 affect on the propagation of light.

In the illustrative embodiment of FIG. 1, the back polarizer 20 is optically coupled to the cell back 58 and to reflective means or a reflector 16. The reflector 16 preferably comprises a diffuse reflector, a specular reflector, or a transflector. Reflector 16 is optically coupled to liquid crystal cell 14, and is effective to receive light emitted from liquid crystal cell 14, and to redirect light back toward cell 14. In a preferred embodiment, reflector 16 is a metallic gain reflector. The surface properties of reflector 16 can be altered in a predetermined manner to effect the amount of diffusion imparted to the ambient light, and in this manner effect the angular distribution of light redirected from the illuminated regions of reflector 16. In this manner, reflector 16 can be a diffuse reflector.

In alternative embodiments, reflective means signifies more than a merely conventional reflector such as the reflector 16. The reflective means may comprise a conventional reflector or transflector coupled to the back of a cell, an optically active material (i.e. liquid crystal material) in a substantially reflective state, or a reflective back electrode.

In using the display, the viewing plane 26 of the liquid crystal display device 10 is illuminated by ambient light. Approximately four percent of the incident ambient light is reflected at a glare angle 54, a glancing angle, or range of glare angles. The remaining incident light 42 enters the opposite surface 24 and emerges from the prismatic surface 28 of the prismatic film 12. The prismatic film 12 effectively refracts the ambient light at an angle that is different from the angle that the light would follow without the prismatic film 12.

Subsequently, front polarizer 18 polarizes the ambient light and transmits linearly polarized light having a first axis of polarization. The linearly polarized light from front polarizer 18 is received by liquid crystal cell 14. As the light passes through cell 14, the liquid crystal material 38 may or may not change the polarization state. The polarization state is dependent upon the electrical potential applied by front electrode 44 and back electrode 46 to a region of the liquid crystal material 38.

Back polarizer 20 receives the light from liquid crystal cell 14 and may pass linearly polarized light. The linearly polarized light may pass to reflector 16 which redirects the light back towards the back polarizer 20. Reflector 16 may redirect the light in a specular manner as a mirror or it may diffuse the light into a preferential diffusion pattern.

The reflected light passes through back polarizer 20 and is transmitted to cell 14 and subsequently through front polarizer 18. Front polarizer 18 emits light that is linearly polarized. The linearly polarized light then encounters back face 28 of the prismatic film 12, and emerges through the opposite surface 24, having been steered through a preferential exiting angle 34 falling within a preferential viewing cone 30.

To ensure that the prismatic film 12 provides glare avoidance, it is important that the beam steering of the light on the way out of the display does not undo the effect of beam steering of the light on the way into the display. When the incident light 42 traverses the prismatic film 12 it is refracted. If the net effect of the refractions through the prismatic film 12 does not adequately divert the light from the glare angle 54, the preferential viewing cone 30 will be aligned with the glare, thereby diminishing the effective brightness of the display. Consequently, the beam diversion or offset must be enough to eliminate the deleterious effects of glare.

Figure 2:
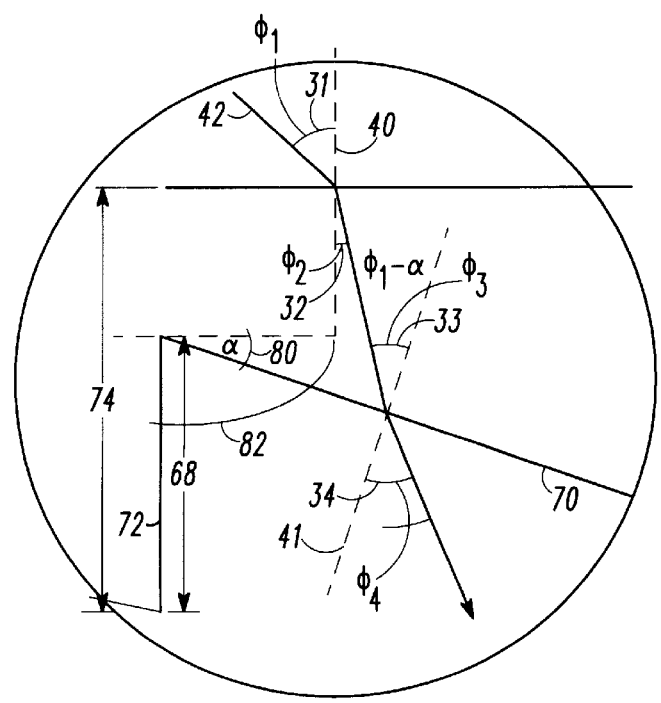
FIG. 2 is an enlarged view of the circular region labeled 2 in FIG. 1.
Figure 3:
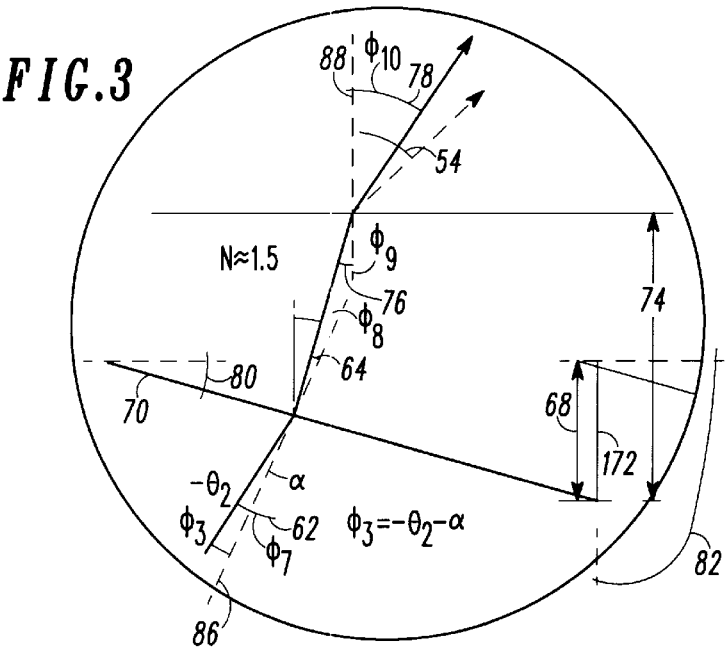
FIG. 3 is an enlarged view of the circular region labeled 3 in FIG. 1.

Referring to FIG. 1 through FIG. 3, the incident light 42 is refracted within the optical display device 10 so that the primary exiting angle has a different magnitude than the incident angle. That is, light entering the optical device at a first angle 31, or the incident angle, has a different magnitude than a tenth angle 78, or the primary exiting angle. The angles are preferably measured with respect to normal reference lines or a main axis 90 which is substantially perpendicular to the viewing plane 26. For example, a first reference normal line is associated with the first angle 31 and a second angle 32.

The direction of the refraction for the light passing through the prismatic film 12 is primarily determined by Snell's law. Snell's law holds that $n_1 \sin \Theta_1 = n_2 \sin \Theta_2$, wherein $n_1$ is the refractive index of medium 1, $n_2$ is the refractive index of medium 2, $\Theta_1$ is the angle that the light in the first medium makes at the refractive interface with respect to a normal reference line, $\Theta_2$ is the angle that the light in the second medium makes at the refractive interface with respect to the normal reference line. If the angle of incidence (i.e. $\Theta_1$) is greater than a critical angle (i.e. $\Theta_{crit}$), then the light undergoes total internal reflection within the first medium. Total internal reflection occurs in accordance with $\sin \Theta_{crit} = n_2/n_1$ for $n_1 > n_2$. Thus, for example, if the angle of incidence is greater than the critical angle, the light does not enter the display, but is reflected as glare relative to the viewing plane 26.

FIG. 1 through FIG. 3 represent typical refractive paths of a representative ray wherein the first index of refraction for the prismatic material is approximately 1.5 and wherein the second index of refraction for an adjoining material is approximately 0.5 less than the first index of refraction. The adjoining material is preferably air or a gas-filled volume with a second index of refraction of approximately 1. In practice, the second index of refraction for the adjoining region the first face 70 may have a lower bound range from 1 to 1.3 depending upon the material used. For a solid adjoining material, the lower practical limit of the second index of refraction is about 1.3 The refractive paths of the representative ray may differ because of different relative refractive indexes, among other factors.

The first section 100 makes a first angle 31 (i.e. $\phi_1$) with respect to a first normal reference line 40, which is perpendicular to the opposite surface 24. The first section 100 is refracted at an interface between the air and the opposite surface 24 so that the second section 101 makes a second angle 32 (i.e. $\phi_2$) with respect to the first normal reference line 40. The first angle 31 (i.e. $\phi_1$) and the second angle 32 (i.e. $\phi_2$) are approximately related by Snell's law such that $\sin \phi_2 = 1/n_2 \sin \phi_1$, wherein $n_2$ is the first refractive index.

The second section 101 makes a third angle 33 (i.e. $\phi_3$) with a second normal reference line 41, which is perpendicular to the front slope 70 of a prismatic structure on the prismatic surface 28. The second section 101 is refracted at a boundary between the front slope 70 and the transparent adhesive 50. The refraction results in a third section 102 making a fourth angle 34 (i.e. φ4) with respect the second normal reference line 41. The third angle 33 (i.e. φ3) is approximately related to the fourth angle 34 (φ4) in accordance with the equation of sin φ4=n2/n3 sin φ3, wherein n2 is the first refractive index and n3 is the second refractive index.

The third section 102 travels through the optical cell 14 and strikes the reflector 16. As the third section 102 travels through the optical cell 14, the light undergoes a first series of refractive bends (not shown) at various intermediate, parallel refractive interfaces within the display. The reflector 16 reflects the third section 102. The reflection of the third section 102 from the reflector 16 is designated the fourth section 103. The third section 102 makes a fifth angle 35 with respect to a third normal reference line 84, which is substantially perpendicular to a reflecting surface of the reflector 16. The fourth section 103 makes a sixth angle 60 with the third normal reference line 84. The fifth angle 35 and the sixth angle 60 are preferably substantially equal. In alternate embodiments, diffuse or nonspecular reflectors may yield a fifth angle which has a peak magnitude at a different angle from the sixth angle 60.

As the fourth section 103 travels through the optical cell 14, the light undergoes a second series of refractive bends (not shown) at various intermediate, parallel refractive interfaces within the display. The net affect on the representative ray is that the second series of refractive bends cancels out the first series of refractive bends. The fourth section 103 travels through the optical cell 14 and strikes the boundary between the prismatic surface 28 and the transparent adhesive 50. The fourth section 103 makes a seventh angle 62 (i.e. φ7) with a fourth normal reference line 86, which is perpendicular to the effected front slope 70 of the prismatic film 12. The fourth section 103 is refracted at the boundary between the prismatic surface 28 and the transparent adhesive 50. The refraction results in a fifth section 104 making an eighth angle 64 (i.e. φ8) with respect to the fourth normal reference line 86. The eighth angle 64 (φ8) is approximately related to the seventh angle 62 (i.e. φ7) by the equation of sin φ8=n3/n2 sin φ7.

The fifth section 104 travels through the prismatic film 12 and strikes the interface between the prismatic surface 28 and the air. The fifth section 104 makes a ninth angle 76 (i.e. φ9) with respect to a fifth normal reference line 88, which is perpendicular to the opposite surface 24. The fifth section 104 is refracted at the boundary between the opposite surface 24 and the air. The refraction results in a sixth section 105 making a tenth angle 78 (i.e. φ10)with respect to the fifth normal reference line 88. The tenth angle 78 (i.e. φ10) is approximately related to the ninth angle 76 (i.e. φ9) by the equation of sin φ10=n2/n1 sin φ9.

Figure 4:
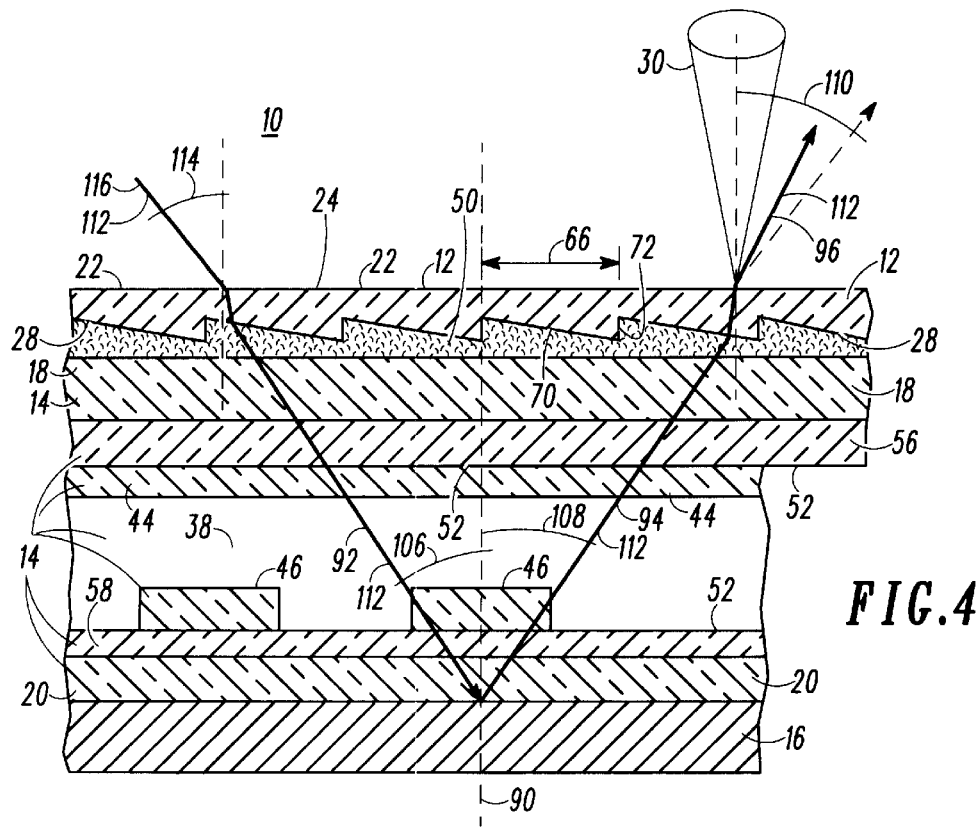
FIG. 4 is a plot depicting a simplified, illustrative light path of the optical display device.

FIG. 4 simplifies the light path 112 through the optical device that was previously illustrated in FIG. 1 through FIG. 3. In sum, the prismatic film 12, the cell 14 and the reflector 16 optically cooperate to form an illustrative light path 112 for incident light 116 illuminating the opposite surface 24 at an incident angle 114 relative to a main axis 90 or an axis parallel to the main axis 90. If the details of the refractions at the interfaces of the prismatic film 12 are ignored for explanatory purposes, the light path 112 may simplified into a primary segment 92, a secondary segment 94, and a tertiary segment 96. The primary segment 92 propagates from the prismatic film 12 toward the reflector 16 at a primary angular measure 106 relative to the main axis 90. The primary angular measure 106 is related to the incident angle 114 by a sinusoidal function, based upon Snell's law. The secondary segment 94 propagates from the reflector 16 toward the prismatic film 12 at a secondary angular measure 108 approximately equal in magnitude and opposite in direction with respect to the primary angular measure 106. The tertiary segment 96 propagates away from the opposite surface 24 at a tertiary angular measure 110 relative to the main axis 90. The tertiary angular measure 110 tends to be distinct or is distinct from the incident angle 114 to contribute to the reduction of glare.

Figure 5:
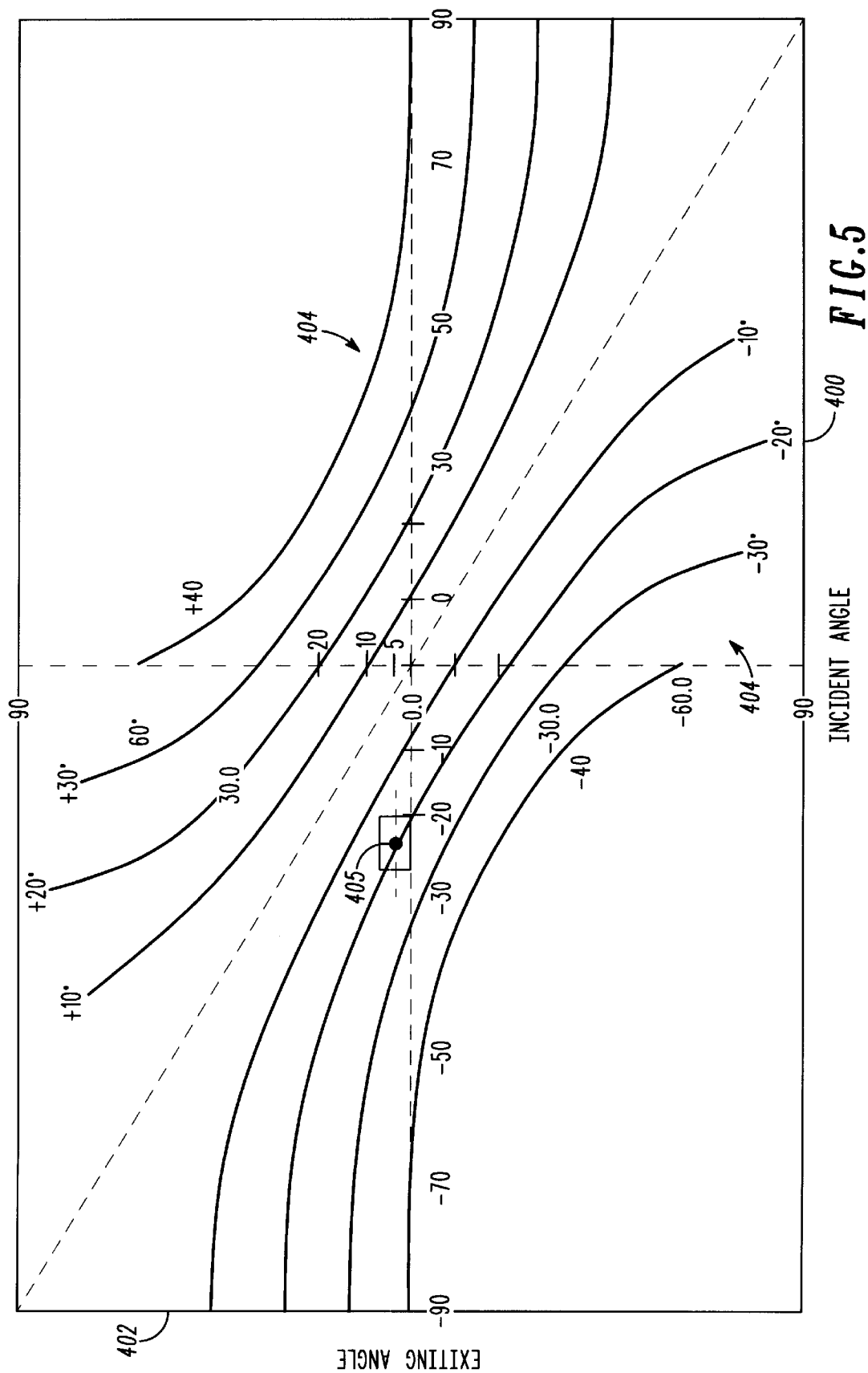
FIG. 5 is a plot depicting the relationship between illumination angle or first angle of the incident light and a preferred viewing angle of the optical display device.

FIG. 5 shows an illustrative plot of incident angles of incident light 42 versus the primary exiting angle of the primary exiting light 43 for various constant values of front slope angles of the prismatic film 12. The incident angles or illumination angles are shown on the horizontal axis 400 in degrees measured with respect to the first normal reference line 40. The primary exiting angles are shown on the vertical axis 402 in degrees measured with respect to the fifth normal reference line 88. In the context of FIG. 5, the primary exiting angle may be referred to as a viewing angle falling within a viewing angle range. The front slope angles are shown as a series of curves 404 with constant front slope angle values ranging from negative ten to negative forty degrees and from positive ten to positive forty degrees. The preferential viewing cone 30 is assumed to be a constant value regardless of the incident angle and exiting angle. Here, the preferential viewing cone 30 is assumed to be from approximately zero degrees to eight degrees, with zero degrees being substantially perpendicular to the plane of the opposite surface 24.

The rectangular region in FIG. 5 surrounds an illustrative, preferred operating point 405 for the prismatic film 12 incorporated into the optical device. For a front slope angle 80 of approximately twenty degrees with an incident angle of approximately twenty-five degrees, the exiting angle is approximately five degrees at a preferred operating point 405. The exiting angle falls within the preferential viewing cone 30. Ideally, the range of exiting angles is commensurate with the range of the preferential viewing cone 30 to provide maximum perceived brightness of the display by a user.

Figure 6:
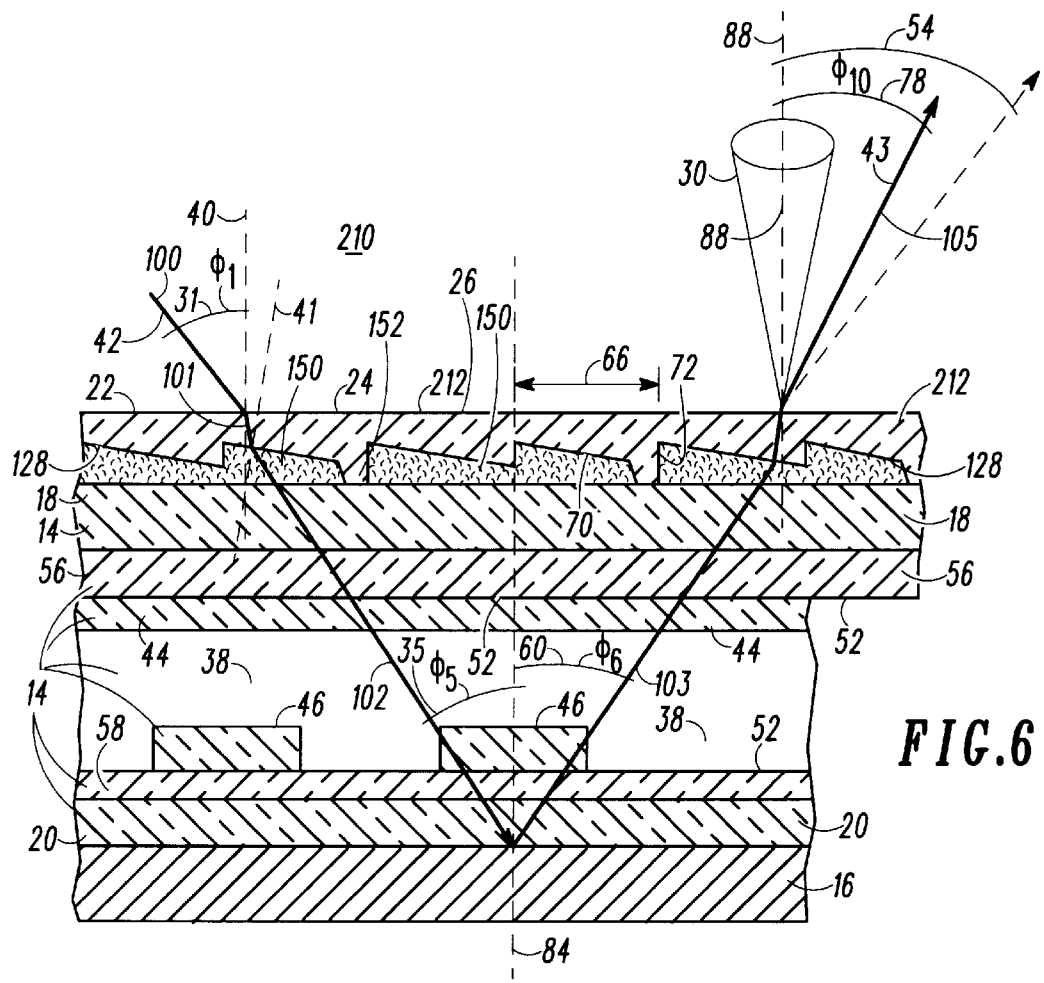
FIG. 6 is a cross-sectional view of a second embodiment of the optical display device.

FIG. 6 shows a cross-sectional view of a second embodiment of the optical display device 210. The second embodiment of FIG. 6 is similar to the first embodiment in FIG. 1 through FIG. 3, except the second embodiment has spacers 152 extending from the prismatic surface 128. The spacers 152 may comprise stand-offs that cooperate with the optical cell 14 to provide a gap 150 between the prismatic film 212 and the optical cell 14. The gap 150 is preferably filled with a gas or a mixture of gases, such as air. Consequently, the transparent adhesive 50 of the first embodiment may be eliminated if the prismatic surface 128 is equipped with appropriate spacers 152 or supports embossed into the prismatic film 212.

The spacers 152 must provide sufficient rigidity to prevent any damage or permanent deformation of the prismatic film 212. The spacers 152 allow the gap 150 or space to bound the prismatic surface 128. The gap 150 contains a gas or a mixture of gases with a suitable refractive index with respect to the first refractive index to practice the present invention. For example, the gap 150 preferably contains air if the first refractive index equals or exceeds 1.4. The spacers 152 are optimally implemented by including first prisms on the prismatic film 212, which have greater heights the remaining second prisms on the prismatic film. While the spacers 152 are integrated into the prismatic film 212, in alternate embodiments the spacers may be separate or distinct from the prismatic film.

In an alternate embodiment, the prismatic film may be supported by placing the peaks of the prisms in contact with the optical cell such that air spaces only adjoin discontinuous regions of the prismatic film, rather the entire prismatic surface.

Figure 7:
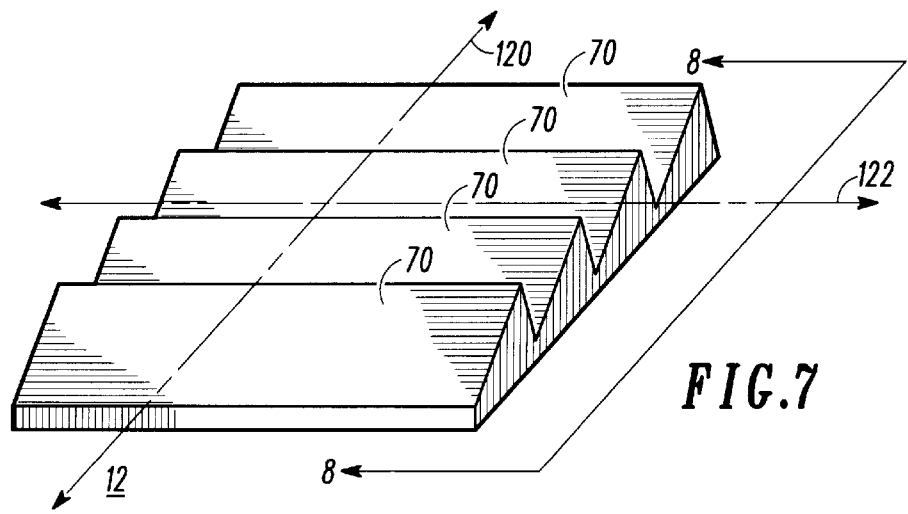
FIG. 7 is a perspective view of a first embodiment of a prismatic film for use in the optical display device.

FIG. 7 and FIG. 8 illustrate the first embodiment of the prismatic film 12 for the optical display. The first face 70 is substantially rectilinearly sloped. The flat or rectilinear shape produces a generally preferential conical viewing cone 30 with a generally circular cross section, which is usually parallel to the viewing plane 26. In alternate embodiments the first face may be convexly or concavely curved or sloped along the cross-sectional axis 120 of the prisms to manipulate the shape and scope of the preferential viewing cone as desired for improved visibility of the display. In general, the preferential viewing cone may be manipulated to change the circular cross section of the preferential viewing cone to an elliptical cross section, which is usually parallel to the viewing plane 26. The elliptical cross section has a major and a minor axis, which are perpendicular to one another. The minor axis represents a diminished viewing breadth of the preferential viewing cone, while the major axis represents an enhanced viewing breadth of the preferential viewing cone.

Accordingly, FIGS. 9 and 10 illustrate a secondary embodiment of the prismatic film 312 in which the prismatic film 312 has first faces 370 that are concavely curved to produce a semi-conical viewing cone with a generally elliptical cross section. The first face 370 of each prism is concavely curved along the cross-sectional axis 120 of the prisms. If the first slope of the first face 370 is concavely curved, the viewing cone may be vertically compressed, so long as the cross-sectional axis 120 of the prisms is parallel with or coincident with the vertical axis of the viewing plane 26. The vertical axis is vertical relative to a viewer's perspective, if the display is oriented appropriately for viewing.

Figure 11:
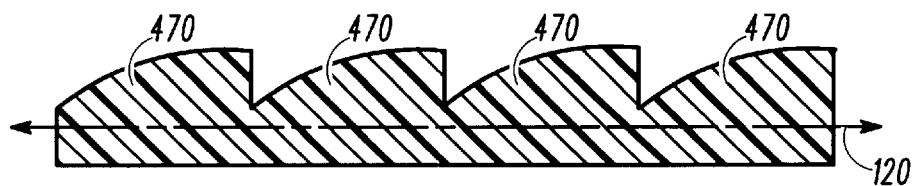
FIG. 11 is a cross-sectional view of a third embodiment of the prismatic film, which has convex first faces.

FIG. 11 shows a third embodiment of the prismatic film 412 in which the first face 470 is convexly sloped along the cross-sectional axis of the prisms 120. If the cross-sectional axis 120 of the third embodiment of the prismatic film 412 is parallel to or coincident with the horizontal axis of the viewing plane, the preferential viewing cone may be horizontally expanded.

Figure 12:
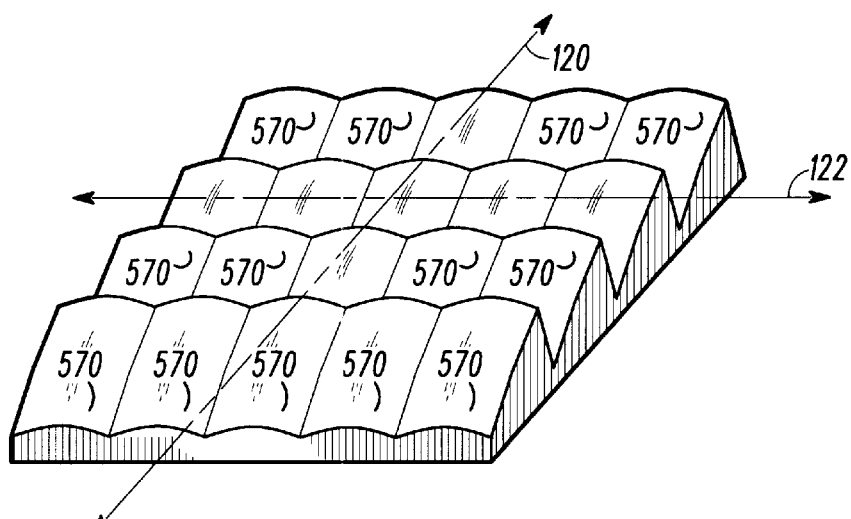
FIG. 12 is a perspective view of a fourth embodiment of prismatic film, which has convex first faces distinct from FIG. 11.

FIG. 12 illustrates a fourth embodiment of the prismatic film 512 in which the first face 570 is convexly sloped along the longitudinal axis 122 of the prisms. In the fourth embodiment of the prismatic film 512, the viewing cone may be horizontally expanded, so long as the longitudinal axis 122 is parallel to or coincident with the horizontal axis of the viewing plane 26. The horizontal axis is horizontal relative to a viewer's perspective.

Figure 13:
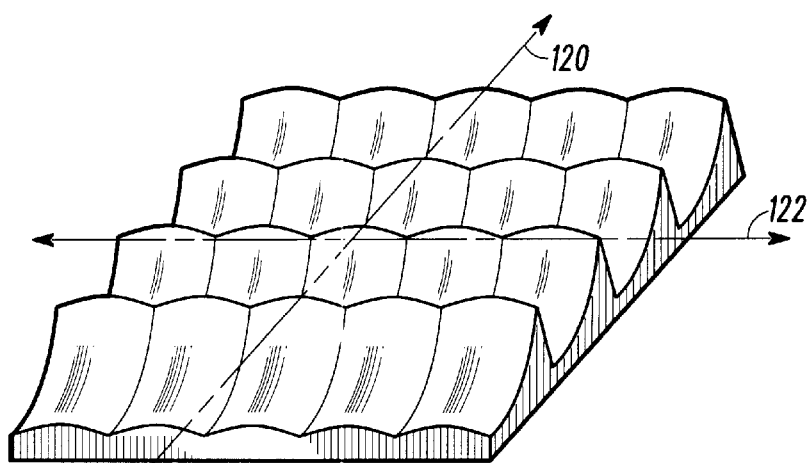
FIG. 13 is a perspective view of a fifth embodiment of the prismatic film which has convexly and concavely sloped first faces.

FIG. 13 illustrates a fifth embodiment of the prismatic film 612 in which the first face 670 is both concavely and convexly sloped. Convexly sloping the first face 670 along the longitudinal axis 122 while concavely sloping the first face 670 along a cross-sectional axis 120, which is orthogonal to the longitudinal axis 122, yields a viewing cone which is simultaneously horizontally expanded and vertically compressed. In yet another alternate embodiment, the second face is concave and has an undercut appearance (i.e. a curved notch, an arched notch, or a semi-elliptical notch) to reduce the refractive, reflective, and optical activity of the second face and unwanted side-lobes relative to the preferential viewing cone. In still other embodiments, the prismatic film may be equipped with prismatic surfaces on two opposing sides to increase the refractive properties of the prismatic film. Any of the foregoing embodiments of the prismatic film may be substituted for the first embodiment of the prismatic film 12 illustrated in FIG. 1, taking care to mount the prismatic film appropriately relative to the intended orientation of the display for viewing purposes.

While the first embodiment and the second embodiment of FIG. 1 and FIG. 6, respectively, show a twisted nematic liquid crystal display, the prismatic film may be incorporated into a polymer dispersed liquid crystal cell, commonly referred to as a PDLC cell. The prismatic film may be optically coupled to a polymer dispersed liquid crystal cell. The PDLC differs from a TN display in that no polarizers are required if dichroic dye is introduced into the liquid crystal material. In the absence of an electric field of a predetermined strength, the liquid crystal material and dichroic dye contained in the droplets are randomly aligned from one droplet to another, and are effective to absorb most incident light. In the presence of an electric field of a predetermined strength, the liquid crystal material and dichroic dye contained in the droplets are aligned in the direction of the applied field, and are effective to transmit substantial amounts of incident light. In this manner, a pixel of polymer dispersed liquid crystal cell can be switched from a relatively transparent state to a significantly less transparent state. The reflective means of a PDLC is preferably a colored gain reflector. The colored gain reflector is a frequency selective reflector, which may only reflect light of a particular color.

While the first embodiment and the second embodiment of FIG. 1 and FIG. 6, respectively, show a twisted nematic liquid crystal display, the prismatic film may be incorporated into a heterogeneously aligned liquid crystal display, commonly referred to as a reflective optically compensated bend cell. The prismatic film may be optically coupled to the optically compensated bend cell between the cell and its viewing interface. One example of such a display is described in detail by "A Bright Reflective LCD Using Optically Compensated Bend Cell with Gray Scale Capability and Fast Response Speed", Uchida, T., Ishinabe, T., Suzuki, M., SID '96 Digest, Vol 27, pg 31–34), which is incorporated herein by reference. In comparison to the twisted nematic display, the heterogeneously aligned liquid crystal display includes only a front polarizer and has a reflective back electrode. While a front electrode is formed of a transparent indium-tin oxide material, a back electrode is formed of a metallic film, such as copper, nickel, chrome or aluminum. Consequently, back electrode functions both as a reflector and an electrode for applying an electric field to the liquid crystal material.

The prismatic film may be incorporated into a cholesteric liquid crystal display. The prismatic film may be optically coupled to the cholesteric liquid crystal cell between its viewing interface and the cell. Commercially available cholesteric displays are sold under the trade names Cholesteric Liquid Crystal Display or ChLCD, Polymer Stabilized Cholesteric Texture Display or PSCT, and Polymer Free Cholesteric Texture Display or PFCT by KDS Company (Kent Ohio) or under the trade name Fast-Response Multistable Liquid Crystal Display or FMLCD by ADS Co. (Richardson, Tex.). Cholesteric displays differ from twisted nematic displays in that the liquid crystal layer in a cholesteric display may be used to selectively reflect a portion of the ambient light of a predetermined color band, and transmit the remaining light, or to transmit all light. The cholesteric liquid crystal cell may have a chiral nematic phase effective to reflect light. A predetermined amount of diffusion is added to the reflected ambient light by the liquid crystal layer. Thus, liquid crystal layer functions as a colored gain reflector and diffuser. A backing layer is effective to absorb a portion of the light transmitted through liquid crystal layer.

The prismatic film may be optically coupled to a light modulating cell, such as a guest-host device, as described in "Guest-host devices using anisotropic dyes" Scheffer, T. J., Philosophical Transactions of the Royal Society of London, Vol 309, pg 189–201, 1983, which is incorporated herein by reference. The prismatic film may be optically coupled to a light modulating cell, which is an electrically controlled birefringence cell (ECB). Such a device is available from Varitronix under the trade name "Color-Coded STN", from Seiko Instruments under the trade name "ECB Color LCD", or from Optrex under the trade name "Super Reflector Color (SRC)".

The above embodiments serve to illustrate possible reflective light modulating cells. Those skilled in the art will appreciate that other reflective light modulating cells can be employed with the present device. Many of these cells are described in "Reflective LCDs for Low Power Systems", Uchida, T., SID '96 Digest, Vol 27, pg 31–34, which is incorporated herein by reference. Such reflective light modulating cells include, but are not limited to other nematic liquid crystal cells such as pi cells, other non-nematic liquid crystal cells such as surface-stabilized ferroelectric liquid crystal cells, anti-ferroelectric liquid crystal cells, and other non-liquid crystal cells such as electrochromic cells, electrophoretic cells, suspended particle cells, and thermally addressable cells.

The present invention provides a liquid crystal display device that uses ambient light for device illumination and utilizes no back light. Consequently, the device consumes less power than a device illuminated by a back light. Further, the apparent brightness of the display device is greatly increased from the offsetting of the exiting angle from the incident angle. In addition, the apparent contrast of the display may be improved by offsetting the exiting angle from the incident angle. This offset is accomplished by the use of a prismatic film, which refracts light entering the display device at an incident angle; and eventually results in light exiting the display device at an exiting angle. The incident angle is different from the exiting angle. In this manner, the brightest output angle of the display is offset from the glare angle, thereby potentially providing an enhanced contrast and brighter display device.

While this invention has been described in terms of certain examples thereof, it is not intended that it be limited to the above description, but rather only to the extent set forth in the claims that follow.

The embodiments of this invention in which an exclusive property or privilege is claimed are defined as follows:

1. An optical display device comprising:
    an optical cell having a cell front with at least one cell region being capable of an optically transmissive mode and an optically nontransmissive mode with reference to the cell front;
    an optically active material contained in the optical cell, the optically active material responsive to an applied electrical field such that optical properties of the material are controllably changeable;
    reflective means for reflecting light incident upon the reflective means toward the cell front, said reflective means associated with the optical cell
    a prismatic film including a prismatic surface facing the cell front and an opposite surface opposite the prismatic surface, the prismatic surface comprising a series of prisms, each of said prisms having a first face and a second face intersecting the first face; the first face oriented to refract light obliquely intercepting the first face, the second face oriented to minimize refractive, reflective and optical interactions of the light with the second face; the prismatic film, the cell, and the reflective means optically cooperating such that light entering a display at an incident angle is emitted from the display at an exiting angle distinct from the incident angle for viewing of the display, the incident angle and the exiting angle measured relative to a normal axis orthogonally extending from a viewing plane substantially parallel to the cell front.

2. The optical display device according to claim 1 wherein the optically active material comprises a liquid crystal material; and wherein a normal axis is oriented perpendicular to the viewing plane; a first magnitude of the exiting angle being at least ten degrees less than a second magnitude of the incident angle if the second magnitude falls within a range from approximately twenty-five degrees to forty-five degrees; the first magnitude and the second magnitude being measured with respect to the normal axis.

3. The optical display device according to claim 1 wherein the opposite surface is substantially planar and wherein the prismatic surface faces the optical cell.

4. The optical display device according to claim 1 wherein the prisms have generally triangular cross-sections.

5. The optical display device according to claim 1 wherein each of said prisms has a first prismatic angle within a range between approximately 15 degrees to 25 degrees, the first prismatic angle formed between a first face of each prism and a plane substantially parallel to the viewing plane.

6. The optical display device according to claim 1 wherein each of said prisms has a second prismatic angle within less than or equal to approximately 90 degrees, the second prismatic angle formed between the second face of each prism and a plane substantially parallel to the viewing plane.

7. The optical display device according to claim 6 wherein the second face is substantially concave and has an undercut appearance.

8. The optical display device according to claim 6 wherein the second face is substantially flat and has an undercut appearance.

9. The optical display device according to claim 1 wherein the prisms adjoin one another; and wherein the prismatic surface has a generally jagged cross-section.

10. The optical display device according to claim 1 further comprising an adhesive affixing the prismatic film to the optical cell.

11. The optical display device according to claim 10 wherein the prismatic film has a first refractive index; the adhesive having a second refractive index, the first refractive index being different than the second refractive index.

12. The optical display device according to claim 11 wherein the first refractive index is greater than the second refractive index.

13. The optical display device according to claim 10 wherein the adhesive is selected from the group of a silicone, an epoxy resin, a polyester resin, and an acrylate resin.

14. The optical display device according to claim 1 further comprising a gap between the optical cell and the prismatic surface.

15. The optical display device according to claim 14 wherein the gap contains a gas.

16. The optical display device according to claim 1 further comprising spacers extending from the prismatic surface at regular intervals to support the prismatic film.

17. The optical display device according to claim 1 wherein the prismatic surface comprises a plurality of first prisms having a first height and a plurality of second prisms having a second height, the first height being greater than the second height, the first prisms being distributed at regular intervals on the prismatic surface.

18. An optical display device comprising:

an optical cell having a cell front with at least one cell region being capable of an optically transmissive mode and an optically nontransmissive mode with reference to the cell front;

an optically anisotropic material contained in the optical cell, the optically anisotropic material responsive to an applied electrical field such that optical properties of the material are controllably changeable;

reflective means for reflecting light incident upon the reflective means toward the cell front, said reflective means associated with the optical cell a prismatic film including an opposite surface and a prismatic surface opposite the opposite surface and facing the cell front; the prismatic film having a first index of refraction and the prismatic surface having its faces angled such that light incident upon the opposite surface at an incident angle is emitted from the opposite surface at an exiting angle distinct from the incident angle for viewing of the display;

an adjoining region disposed within the display device and adjoining the prismatic surface, the adjoining region composed of a material having a second index of the refraction different from the first index of refraction.

19. The optical display device according to claim 18 wherein the adjoining region comprises a substantially transparent adhesive which has a second index of refraction that is lower than the first index of refraction by a range from approximately 0.3 to 0.2.

20. The optical device according to claim 18 wherein the adjoining region comprises a confined volume of air.

21. The optical display device according to claim 18 wherein the optically anisotropic material comprises a liquid crystal material dispersed in a polymeric matrix.

22. The optical display device according to claim 18 wherein said reflective means comprises a reflective portion of the optically anisotropic material, the reflective portion being in a reflective chiral nematic phase as one of said optical properties.

23. The optical display device according to claim 18 wherein said reflective means comprises a reflector optically coupled to the optical cell.

24. The optical display device according to claim 18 wherein said reflective means comprises a reflective electrode, the electrode being oriented for exposing the optically active material to the electric field.

25. In a reflective optical display device including an optically active material responsive to an applied electrical field such that the optical properties of the material are controllable changeable, wherein the improvement comprises:

a prismatic film optically coupled to the optically active material, the prismatic film having an index of refraction, the prismatic film including a opposite surface and a prismatic surface opposite the opposite surface and facing inward toward the optically active material;

the prismatic surface having a generally jagged cross-section formed by intersecting faces, the intersecting faces having angles relative to the opposite surface, the angles and the index selected to refract light such that light incident upon the optical display device within an incident angle range are refracted within an exiting angle range which is closer to a normal axis than the incident angle range is, the normal axis oriented perpendicular to the opposite surface.

26. The reflective optical display according to claim 25 wherein the incident angle range comprises approximately twenty-five to forty-five degrees from the normal and wherein the exiting angle range is from zero to approximately ten degrees from the normal.

27. The reflective optical display according to claim 25 wherein the intersecting faces include a sloped face having an angle within a range between approximately fifteen to twenty-five degrees with respect to a plane parallel to the opposite surface.

28. The reflective optical display according to claim 25 wherein the reflective optical display further comprises a transparent adhesive affixing the prismatic film to the optical display, the transparent adhesive selected to have an index of refraction which differs from the index of refraction of the prismatic material by greater than 0.3.

29. The reflective optical display according to claim 25 wherein the prismatic surface comprises a series of adjacent prisms with substantially triangular cross sections.

30. An optical display device comprising:

an optical cell having a cell front with at least one cell region being capable of an optically transmissive mode and an optically nontransmissive mode with reference to the cell front;

an optically active material contained in the optical cell, the optically active material responsive to an applied electrical field such that optical properties of the material are controllably changeable;

reflective means for reflecting light incident upon the reflective means toward the cell front, said reflective means associated with the optical cell a prismatic film including a prismatic surface optically coupled to the optical cell and an opposite surface opposite the prismatic surface, the prismatic surface comprising a series of prisms, each of said prisms having a first face and a second face intersecting the first face; the first face oriented to refract light obliquely intercepting the first face, the second face oriented to minimize refractive, reflective and optical interactions of the light with the second face; the prismatic film, the cell, and the reflective means optically cooperating such that light entering a display within a nonglancing incident angle range is emitted from the display at an exiting angle range distinct from the incident angle range and within a preferential viewing cone, the incident angle range and the exiting angle range measured relative to a normal axis orthogonally extending from a viewing plane substantially parallel to the cell front.

31. The optical display according to claim 29 wherein the first face is substantially rectilinearly sloped and wherein the preferential viewing cone has a generally circular cross-section oriented substantially parallel to the viewing plane.

32. The optical display according to claim 29 wherein the first face is concavely curved.

33. The optical display according to claim 29 wherein the first face is concavely curved along a cross-sectional axis of the prisms, and wherein the cross-sectional axis is coincident with or parallel to a vertical viewing axis of the viewing plane such that the preferential viewing cone is generally elliptical and vertically compressed.

34. The optical display according to claim 29 wherein the first face is convexly curved.

35. The optical display according to claim 29 wherein the first face is convexly curved along a cross-sectional axis of the prisms, and wherein the cross-sectional axis is coincident with or parallel to a horizontal viewing axis of the viewing plane such that the preferential viewing cone is generally elliptical and horizontally expanded.

36. The optical display according to claim 29 wherein the first face is concavely curved along a cross-sectional axis of the prisms and convexly curved along a longitudinal axis of the prisms, the longitudinal axis being perpendicular to the cross-sectional axis, the longitudinal axis oriented coincident with or parallel to a horizontal viewing axis of the viewing plane such that the preferential viewing cone simultaneously is horizontally expanded and vertically compressed.

37. A liquid crystal display device comprising:

an optical cell having a cell front, a cell back opposite the cell front, and at least one cell region having a transparent mode;

a reflector optically coupled to the cell back to receive light traversing the cell region and to reflect the light toward the optical cell; and a prismatic film including a generally planar opposite surface and a prismatic surface opposite from the opposite surface having an axis normal thereto, the prismatic surface facing the cell front, the prismatic film optically coupled to the cell front; the prismatic film, the cell and the reflector optically cooperating to form a light path for light illuminating the opposite surface at an incident angle relative to the axis, said path comprising:

a primary segment propagating from the prismatic film toward the reflector at a primary angular measure relative to said axis, the primary angular measure related to the incident angle by a sinusoidal function;

a secondary segment propagating from the reflector toward the prismatic film at a secondary angular measure approximately equal in magnitude and opposite in direction with respect to the primary angular measure;

a tertiary segment propagating away from the opposite surface at a tertiary angular measure relative to the axis, the incident angle being distinct from the tertiary angular measure.

* * * * *

UNITED STATES PATENT AND TRADEMARK OFFICE
CERTIFICATE OF CORRECTION

PATENT NO.   : 6,166,787
DATED        : December 26, 2000
INVENTOR(S)  : Akins et al.

It is certified that error appears in the above-identified patent and that said Letters Patent is hereby corrected as shown below:

Claim 31,
Line 56, after claim, delete "29" and insert -- 30 --

Claim 32,
Line 60, after claim, delete "29" and insert -- 30 --

Claim 33,
Line 62, after claim, delete "29" and insert -- 30 --

Claim 34,
Line 1, after claim, delete "29" and insert -- 30 --

Claim 35,
Line 3, after claim, delete "29" and insert -- 30 --

Claim 36,
Line 9, after claim, delete "29" and insert -- 30 --

Signed and Sealed this

Eighteenth Day of December, 2001

*Attest:*

*Attesting Officer*

JAMES E. ROGAN
*Director of the United States Patent and Trademark Office*